Nov. 2, 1954  T. C. APPLEMAN  2,693,165

VISUAL INDICATING DEVICE

Filed May 3, 1952

INVENTOR
THEODORE C. APPLEMAN

BY *R. J. Eisinger*

ATTORNEY

United States Patent Office 2,693,165
Patented Nov. 2, 1954

2,693,165

VISUAL INDICATING DEVICE

Theodore C. Appleman, Mansfield, Ohio, assignor to Westinghouse Electric Corporation, East Pittsburgh, Pa., a corporation of Pennsylvania Application May 3, 1952, Serial No. 285,913

6 Claims. (Cl. 116—124)

This invention relates to a control mechanism having a signal light provided therein, especially a manually adjustable control in which the setting of the control is indicated by colored light visible to the operator.

An object of the invention is to provide a relatively inexpensive knob construction for such a control in which the color of the light is changed in the different positions of the knob.

A further object of the invention is to provide a knob arrangement for such a control which has relatively few parts and is easily manufactured with a minimum of labor.

In the control art of today, it is a common practice to provide means for transmitting colored light through knobs, dials, pointers and the like to facilitate determining the setting of the control at a distance therefrom. Polymerized methyl methacrylate resin, which is sold under the trade-marks of Lucite and Plexiglas, has been utilized in this field, since it has optical qualities which are highly desirable and it may be molded by means of dies. However, this material is relatively expensive. With my construction, the need for polymerized methyl methacrylate resin is obviated and opaque plastic of relatively low cost may be utilized without sacrifice in utility, durability or efficiency. Whereas, with the use of polymerized methyl methacrylate resin, light from a lamp source is generally reflected as desired by internal reflection, that is, reflection during transmission through the substance, I utilize external reflection, that is, reflection by impingement of light on the external surface of a substance.

In accordance with the above objects, I provide a generally cylindrical knob structure having apertures or windows spaced circumferentially from each other and disposed adjacent one end of the knob to permit passage of light from a point exterior of the knob to the inner confines of the knob. Within the knob and disposed in a position adjacent to and central with respect to the windows, I provide a reflecting surface which serves to reflect the light passing through the windows and to direct it through the other end of the knob. The knob and the reflecting surface are made of opaque phenolic resin or the like. The windows have translucent colored members disposed therein to modify the light transmitted from an external lamp source by changing its color to indicate the position of the knob. As the knob is rotated to its various positions, the light passing into the knob and through the other end of the knob will be modified accordingly.

The above and other objects are effected by my invention as will be apparent from the following description taken in connection with the accompanying drawings, forming a part of this application, in which.

Figure 1:
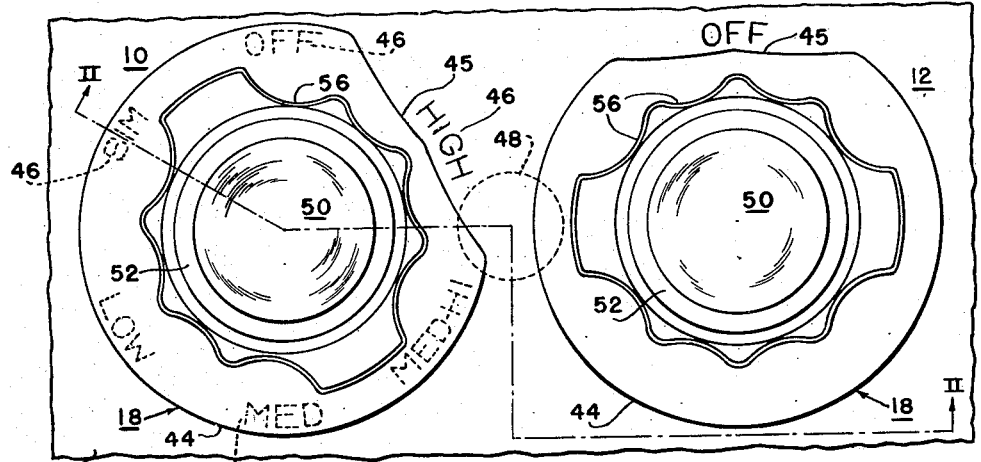
Fig. 1 is an elevational view showing my invention embodied in a pair of control switches.
Figure 2:
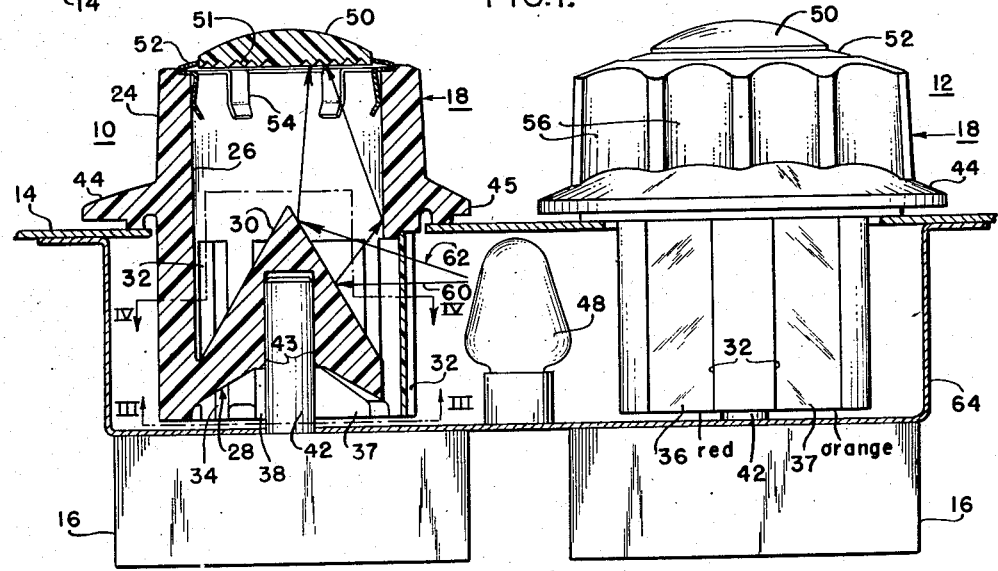
Fig. 2 is a section taken on line II—II of Fig. 1.

Referring to the drawings in detail, especially Figs. 1 and 2, there are shown two control mechanisms, generally designated 10 and 12, respectively, disposed in side-by-side relation to each other and mounted on a panel 14. The control mechanisms 10 and 12 are similar except as will be described.

The control 10 has a rotatably adjustable switch 16 disposed behind the panel 14 and connected to a rotatable adjusting knob 18.

The adjusting knob 18 is provided with a tubular wall portion 24 extending through an opening in the panel 14 and is rotatable about the central longitudinal axis of the wall portion for actuating the switch. The tubular wall has an inner surface 26 which is preferably circular in cross section and concentric with the axis of rotation of the knob. The rear end of the tubular wall 24 is closed by a wall 28 having an inner surface 30 which is preferably shaped like a cone having its axis coincident with the central axis of the inner surface 26 and extending forwardly within the confines of the latter. A plurality of generally rectangular windows 32 are provided in the tubular wall 24 rearwardly of the panel 14 and adjacent the rear end. The windows are uniformly spaced from each other circumferentially or angularly of said axis and are of uniform width and height. Each of the windows 32 is provided with a pair of dove-tailed side walls 34.

One window is provided for each position of the switch. In the embodiment illustrated, for example, the switch is adjustable to five operating positions and an "Off" position, so that six windows 32 are provided. Each of the windows is provided with one of a plurality or set of sheet members, including an opaque sheet 35 and colored translucent members 36 to 40. Thus, when the knob is rotated, the sheet members will be sequentially passed through a given reference point. The sheet members are maintained within the windows 32 by frictional engagement with the dove-tailed walls 34 and may be inserted therein by a sliding action.

The switch 16 is actuated by a shaft 42, to which the knob 18 is keyed. The shaft 42 has a non-circular cross section which is received in a mating bore 43 in the end wall 28 of the knob.

The knob is provided with an annular skirt portion 44 which extends radially outwardly from the tubular wall 24 in front of the adjacent portion of the panel 14. The skirt portion 44 is generally circular in outline, except for a substantially straight index portion 45. The panel 14 is provided with a plurality of indicia or legends 46, disposed in a circular pattern about and adjacent the knob. The legend at which the index portion 45 is positioned is exposed and indicates the position of the control, while the remaining legends are hidden by the skirt portion.

The sheet members may be colored as desired. For example, each sheet member may be of the color and may designate the position set opposite its reference numeral as follows:

| Numeral | Color | Switch Position |
|---|---|---|
| 35 | Opaque | Off. |
| 36 | Red | High. |
| 37 | Orange | Medium-High. |
| 38 | Yellow | Medium. |
| 39 | Blue | Low. |
| 40 | Green | Simmer. |

Figure 4:
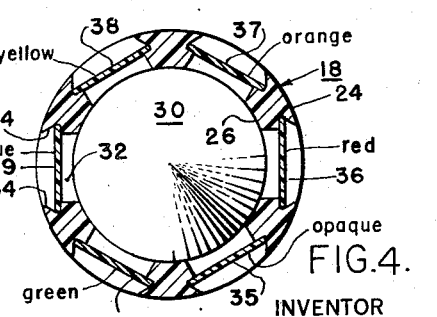
Fig. 4 is a section taken on line IV—IV of Fig. 2 with the control in the "High" position.

The sheet members 35 to 40 are arranged in the above sequence reading counterclockwise, when the knob 18 is viewed as shown in Figs. 1 and 4.

A small lamp 48 is disposed behind the panel 14, to the right of the control mechanism 10, in such a manner that its light rays will pass through one of the windows 32, depending upon the position of the knob. Referring to Fig. 1, it will be seen that the "Off" indicia is disposed directly above the axis of rotation of the knob while the lamp 48 is disposed to the right of the axis of rotation of the knob. The sheet members are arranged in the windows 32 in such a manner that when the knob is in the "Off" position, the opaque sheet member 35 is disposed adjacent the lamp, thereby preventing light rays from the lamp from passing therethrough. Accordingly, the opaque sheet member 36 is displaced 90 degrees to the right of the index portion 45 of the skirt when viewed from the front of the panel 14. When the knob is rotated to the "High" position, the red translucent sheet member 36 will be positioned adjacent the lamp, thereby modifying the light from the lamp 48 and permitting red light to pass therethrough to the inner confines of the knob.

The opening at the front end of the tubular portion 24 is closed by a translucent light-diffusing member 50. The light-diffusing member is preferably made of glass and is provided with a plurality of concentric serrations 51 on its inner surface, while its outer surface is smooth and convexed. The serrations 51 serve to diffuse the colored light passing through the diffusing member. The member 50 is supported within a metal retaining ring 52 which is held on the knob by a plurality of resilient tongues 54 engaging the surface 26.

The front portion of the knob is further provided with a fluted finger gripping portion 56 to facilitate rotation of the knob.

Operation

When the knob is in the "Off" position, the opaque member 35 is in registry with the lamp 48, obstructing the light rays emitted by the lamp and preventing them from entering through the associated window 32. Thus, no light is transmitted through the knob to the observer and the diffusing member 50 is not illuminated.

Figure 3:
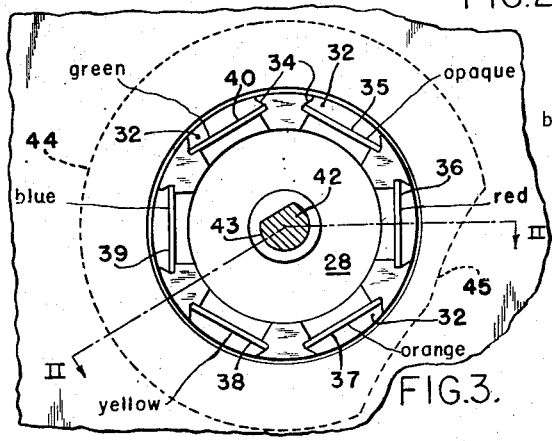
Fig. 3 is a section taken on line III—III of Fig. 2 with the control in the "High" position.

When the knob 18 is rotated clockwise as seen in Fig. 1, or counterclockwise as seen in Fig. 3, to the "High" position, the index portion 45 exposes the legend "High" and simultaneously the red translucent member 36 is brought into registry with the lamp 48. Light rays emitted by the lamp are transmitted through the red sheet member 36 and modified thereby as red light. They then impinge on the conical surface 30 and are reflected forwardly to the observer through the diffusing member 50. The light rays passing through the red sheet member are directed through the diffusing member in several manners. Some light rays, for example, the light ray denoted by the numeral 60, impinge on the cone 30 at such an angle that they are reflected thereby against the inner surface 26 and subsequently reflected thereby through the diffusing member 50. Other light rays, for example, the light ray denoted by the reference numeral 62, pass through the red sheet member and impinge on the cone 30 at such an angle that they are reflected upwardly directly through the diffusing member 50. Obviously, a myriad of light rays similar to the light rays 60 and 62 are reflected by the cone 30 through the interior of the tubular portion 24, causing the same to be flooded with light visible to the observer through the diffusing member 50. The serrations 51 on the diffusing member cause the light rays to be further spread in passing through the diffusing member, creating a fully illuminated disk of red light.

Similarly, when the knob is rotated to the "Medium-High" position, the legend "Medium-High" is exposed by the index portion 45 and the orange member 37 is brought into registry with the lamp 48. Light rays from the lamp are transmitted through the orange member against the cone 30 and are reflected upwardly through the diffusing member 50 in the same manner described in conjunction with the "High" position, thereby illuminating the diffusing member with orange colored light.

When the knob is rotated to the "Medium," "Low," or "Simmer" position, the yellow member 38, the blue member 39 or the green member 40, respectively, is brought into registry with the lamp in the same manner as described in conjunction with the "High" and "Medium-High" positions.

The right-hand control mechanism 12 is similar to the left-hand control 10. However, the lamp 48 is disposed to the left of the control 12 and light rays from the lamp pass through the sheet members in the direction from left to right as shown in Figs. 1 and 2. In order to maintain the same color sequence for the same positions of the knob, the sheet members are disposed in the windows 32 in the same sequence to those of the control 10 but shifted out of phase therewith by an angle of 180 degrees. Accordingly, the opaque sheet 35 is disposed 90 degrees to the left of the index portion 45, when viewed from the front of the panel.

The controls 10 and 12 and the lamp 48 may be attached to the panel 14 in any desired manner. For the purpose of illustration, I have shown a sheet metal mounting plate 64 of substantially U-shape, which is provided with openings for the switch shafts 42, and is attached to the panel in any desired manner (not shown).

It will now be seen that the invention described provides a control, having a signal light of changeable color corresponding to the various positions of the control, which is relatively simple, composed of a minimum of parts and easily manufactured. The knob 18 may be molded of any desired material, for example, the opaque plastics. Since the knob may be made of opaque plastic, the color of the plastic material may be selected, as desired. For example, in an electric range having a white porcelain surface, the knob may be made of white plastic to harmonize with its surroundings. On the other hand, if a contrast is desired, the knob may be made of black or other dark colored plastics.

The tubular inner surface 26 and the conical surface 30 may be provided with a smooth finish of the type obtained in molding. When white or other light colored plastics are utilized, the surfaces 26 and 30 need no further coating or processing to amplify their light reflecting properties. However, when a black or other dark colored plastic is utilized, the surfaces 26 and 30 may be coated with a highly reflective material, such as white or silver paint, to increase the reflective property of the dark plastic.

Since the diffusing member 50 has a smooth exterior surface, it may be easily wiped clean and will not catch dirt which would reduce its light transmitting efficiency.

In the event that a knob becomes damaged, it may be removed from the switch shaft 42 merely by pulling on the knob in a direction away from the panel. Since the fit between the bore 43 and the switch shaft 42 is a slide fit, the two are easily separated. A new knob may be readily installed.

With the arrangement described, if the operator is not acquainted with the color code, he may determine the position of the switch 16 by noting the legend exposed by the index 45. However, if he is acquainted with the color code, he may determine the position of the switch 16 at a distance therefrom, merely by noting the color of the light transmitted through the diffusing member 50.

As previously mentioned, the inner surface 26 is preferably circular in cross section and its main function is to reflect light through the diffusing member 50. The cross-sectional outline of the inner surface 26 may be modified as desired and is not critical. It is entirely within the scope of the invention to form the surface with facets to thereby provide a polygonal cross section, such as hexagonal, octagonal, etc.

Similarly, although the specification recites the rear end wall 28 as having a conical surface 30, it is entirely within the scope of the invention to facet the surface 30 in such a manner that it forms a pyramid. For purposes of simplicity, the term "pyramid" has been utilized in the claims in its broadest geometrical sense and is intended to include a cone. The main object of the surface 30 is to reflect the modified light rays from the lamp 38 upwardly toward the diffusing member 50. Forming a reflecting surface with a plurality of facets or reflecting surfaces is well known in the art. For this reason, embodiments showing such variations have not been illustrated.

While I have shown my invention in but one form, it will be obvious to those skilled in the art that it is not so limited, but is susceptible of various changes and modifications without departing from the spirit thereof.

What I claim is:

1. A rotatable adjusting knob for use with a control mechanism having a rotatable operating shaft; said knob comprising a tubular wall having an inner surface concentric with the axis of rotation of the knob, an end wall connected to said tubular wall, said end wall having an outer surface and an inner surface, said inner surface of said end wall extending into the confines of said tubular wall and tapering in the direction of the axis of rotation of the knob, said inner surfaces having light reflecting properties, a plurality of windows disposed in said tubular wall adjacent said inner surface of said end wall, said windows being spaced from each other angularly about the axis of rotation of the knob and admitting light rays to said inner surfaces, said inner surface of said end wall serving to reflect the light rays passing through said windows and directing the same away from said end wall, and said knob having a portion adapted for connection to a shaft.

2. A rotatable adjusting knob for use with a control mechanism having a rotatable operating shaft; said knob comprising a tubular wall having an inner surface concentric with the axis of rotation of the knob, an end wall connected to and closing one end of said tubular wall, said end wall having an inner surface extending into the confines of said tubular wall and tapering in the direction of the axis of rotation, a plurality of windows disposed in said tubular wall adjacent said inner surface of said end wall, said windows being spaced from each other angularly about the axis of rotation of the knob, and a plurality of translucent sheet members of different colors, each of a plurality of said windows being provided with one of said translucent members, said inner surfaces having light reflecting properties, and said end wall having a portion adapted for connection to a shaft.

3. The structure recited in claim 1 and further including a skirt portion disposed externally of said tubular wall and formed integrally therewith, said skirt portion having a face disposed normal to the axis of rotation of the knob.

4. The structure recited in claim 2 in which said structure is provided with a second end wall disposed oppositely from said first-mentioned end wall, said second end wall being made of translucent material.

5. A manually adjustable control mechanism comprising a switch having a movable adjusting member, a knob connected to said member and rotatable for manually adjusting said control mechanism, said knob having a tubular wall, said wall having an inner surface concentric with the axis of rotation, an end wall connected to said tubular wall, said end wall having an inner surface extending into the confines of said tubular wall and tapering in the direction of the axis of rotation, said inner surfaces having light reflecting properties, a plurality of windows disposed in said tubular wall adjacent said inner surface of said end wall, said windows being spaced from each other angularly about the axis of rotation of the knob, a colored translucent sheet member in each of a plurality of said windows, and a light source disposed exteriorly of said knob, each of said windows being movable to a position to intercept and change the color of light rays from said light source, said inner surfaces serving to direct said colored light rays by external reflection through said knob in a direction away from said end wall.

6. The structure recited in claim 5 in which said knob has an opening defined by the inner surface of said tubular wall at the end remote from said end wall, and further including a translucent light diffusing member disposed in said opening.

References Cited in the file of this patent

UNITED STATES PATENTS

| Number | Name | Date |
|---|---|---|
| 1,850,656 | Booth | Mar. 22, 1932 |
| 2,081,827 | Lohe | May 25, 1937 |
| 2,191,045 | Slayton | Feb. 20, 1940 |
| 2,218,074 | Smith | Oct. 15, 1940 |
| 2,334,479 | Creager | Nov. 16, 1943 |
| 2,541,892 | Schulze | Feb. 13, 1951 |